US011833989B1

(12) United States Patent
Kurtovic

(10) Patent No.: US 11,833,989 B1
(45) Date of Patent: Dec. 5, 2023

(54) OBJECT DETECTION SYSTEMS FOR VEHICLES AND METHODS OF CONTROLLING AIRBAGS USING OBJECT DETECTION SYSTEMS

(71) Applicant: Toyota Motor Engineering & Manufacturing North America, Inc., Plano, TX (US)

(72) Inventor: Kenan Kurtovic, Troy, OH (US)

(73) Assignees: Toyota Motor Engineering & Manufacturing North America, Inc., Plano, TX (US); Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 17/880,000

(22) Filed: Aug. 3, 2022

(51) Int. Cl.
*B60R 21/015* (2006.01)
*B60R 21/205* (2011.01)

(52) U.S. Cl.
CPC ...... *B60R 21/01512* (2014.10); *B60R 21/205* (2013.01)

(58) Field of Classification Search
CPC .................................................. B60R 21/0153
See application file for complete search history.

(56) References Cited

U.S. PATENT DOCUMENTS

| 6,443,488 | B1 | 9/2002 | Kippelt et al. |
| 6,459,974 | B1 | 10/2002 | Baloch et al. |
| 6,796,578 | B2 | 9/2004 | White et al. |
| 7,198,291 | B2 | 4/2007 | Konda et al. |
| 9,599,747 | B2 | 3/2017 | Kuntze et al. |
| 10,676,058 | B2 | 6/2020 | Ghannam et al. |
| 2007/0100525 | A1 | 5/2007 | Mattes et al. |
| 2019/0322233 | A1 | 10/2019 | Rivaya |

FOREIGN PATENT DOCUMENTS

| CN | 107451851 B | * | 9/2022 | ............... E05F 15/40 |
| CN | 115402212 A | * | 11/2022 | ....... B60R 21/01512 |
| JP | H07196006 A | * | 8/1995 | |
| JP | 10044921 A | | 2/1998 | |
| JP | 2012121378 A | * | 6/2012 | ....... B60R 21/01516 |
| WO | WO-0166386 A1 | * | 9/2001 | ....... B60R 21/01504 |
| WO | WO-2016209415 A1 | * | 12/2016 | ............. B60Q 5/005 |
| WO | WO-2021257571 A1 | * | 12/2021 | ....... B60R 21/01512 |

* cited by examiner

*Primary Examiner* — Nicole T Verley
(74) *Attorney, Agent, or Firm* — Dinsmore & Shohl LLP

(57) ABSTRACT

A vehicle includes a vehicle structure an airbag deployment location and an external skin layer that covers the airbag deployment location. An object detection sensor is located on or covered by the external skin layer of a vehicle component and located within an object detection zone. The object detection sensor is configured to provide a signal to a controller upon detecting an object within the object detection zone.

12 Claims, 4 Drawing Sheets

OBJECT DETECTION SYSTEMS FOR VEHICLES AND METHODS OF CONTROLLING AIRBAGS USING OBJECT DETECTION SYSTEMS

TECHNICAL FIELD

The present specification generally relates to airbag systems for vehicles and, in particular vehicles including object detection systems and methods of controlling airbags using object detection.

BACKGROUND

Many vehicles, particularly modern vehicles, include airbag systems that can inflate in the event of a collision. Occupant Classification Systems (OCS) may be used by the vehicles to detect presence and characteristics of vehicle passengers and drivers, such as weight, to determine whether or not an airbag should be deployed or even how the airbag should be deployed. The OCSs may include, for example, a sensor that is located in the seat for detecting weight. Some OCSs may detect seating position using optical images from an onboard camera.

Airbags usually need to be deployed quickly when the airbags are in use. Loose objects on or near an airbag deployment location can be thrown in the vehicle when an airbag is deployed. Accordingly, a need exists to provide object detection systems and methods to detect when objects are at or near an airbag deployment location.

SUMMARY

In one embodiment, a vehicle includes a vehicle structure an airbag deployment location and an external skin layer that covers the airbag deployment location. An object detection sensor is located on or covered by the external skin layer of a vehicle component and located within an object detection zone. The object detection sensor is configured to provide a signal to a controller upon detecting an object within the object detection zone.

In another embodiment, a method for automatically controlling deployment of an airbag using an object detection system is provided. The method includes activating the object detection system. A controller of the object detection system looks for a signal from an object detection sensors located on or covered by an external skin layer of a vehicle component and located within an object detection zone. The object detection sensor is configured to provide a signal to a controller upon detecting an object within the object detection zone. The controller of the object detection system receives a signal from the object detection sensor. The controller of the object detection system instructs an airbag control system to not deploy an airbag based on the signal.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to vehicles that include object detection systems. The vehicles include instrument panels or other vehicle structures that include airbag deployment locations and object detection sensors located at the airbag deployment locations in the vehicle structures. In some embodiments, the object detection sensor may be located above the airbag deployment locations or between an outer skin of the vehicle structures and the airbag deployment locations. The object detection sensor may be configured to provide a signal to a controller if an object is located on or above the object detection sensor.

It is noted that the present disclosure may be applied to any vehicle. It is contemplated that the vehicle may or may not be an autonomous vehicle or a partially autonomous vehicle. When referring to autonomous or partially autonomous vehicles, it is meant to refer to vehicles having at least one drive mode wherein a human operator is not necessary to guide the vehicle. However, embodiments of the present disclosure are also applicable to fully human drivable vehicles.

Figure 1:
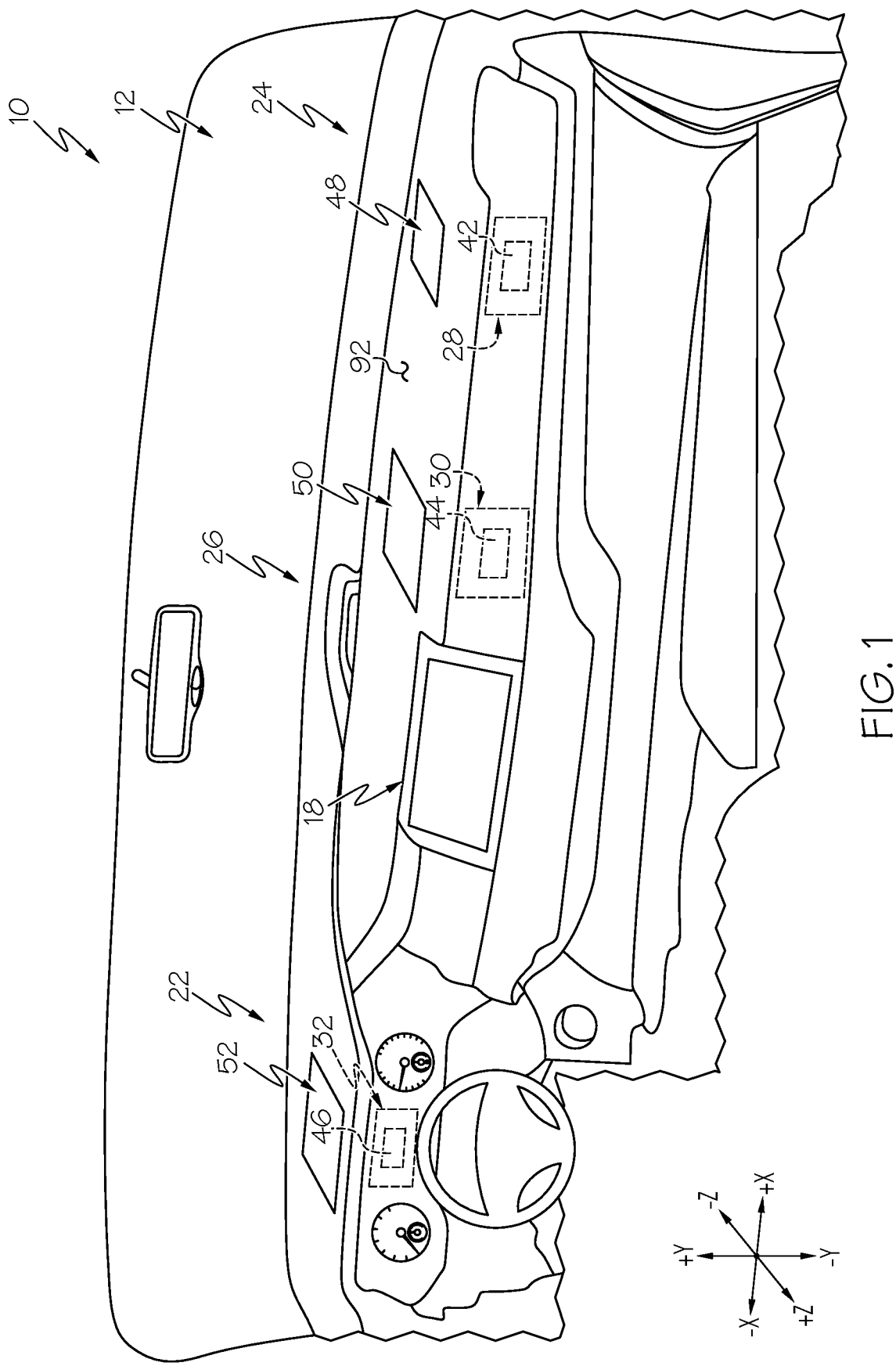
FIG. 1 depicts an interior of a cabin of a vehicle including an object detection system, according to one or more embodiments shown and described herein.

Referring to FIG. 1, an interior of a vehicle 10 is illustrated and, in particular, an interior of a cabin 12 of the vehicle 10. The cabin 12 includes an instrument panel 14, sometimes referred to as a dashboard, that includes a display 18 for a head unit of the vehicle 10. The term "head unit," sometimes referred to as an infotainment system, refers to a component providing a unified hardware interface, including screens buttons and system controls for information and entertainment. The instrument panel 14 includes a driver side portion 22 and a passenger side portion 24. The driver side portion 22 and the passenger side portion 24 may meet at a central portion 26 that is located at the display 18. In some embodiments, the driver side portion 22 and the passenger side portion 24 may be reversed or there may be a driver side portion 22 without the passenger side portion 24.

The instrument panel 14 may include one or multiple airbag deployment locations 28, 30 and 32. There may be additional airbag deployment locations elsewhere in the vehicle 10 at different vehicle structures, such as in steering wheel 34, in side doors, in seats, etc. As used herein, the term "airbag deployment location" refers to any location from which an airbag is deployed. For example, an airbag may be located within a storage compartment 42, 44 and 46 as part of the airbag deployment locations 28, 30 and 32 located behind an openable panel, opening, etc. through which the airbag is deployed from the storage compartment 42, 44 and 46.

The instrument panel 14 includes object detection zones 48, 50 and 52 that are located within areas of the airbag deployment locations 28, 30 and 32 that are projected onto an external skin 92 of the instrument panel 14 (or other vehicle structure). As used herein, the term "object detection zone" refers to an area in which an object detection sensor can detect the physical presence of an object therein. The object detection zone includes only that area in which the presence of an object can be detected by the object detection sensor, as will be described below. Thus, if an object cannot be detected at a particular location by the object detection sensor, that location is not part of the object detection zone. In the object detection zones 48, 50 and 52 are one or more object detection sensing devices, also represented by elements 48, 50 and 52, that can detect the presence of a foreign object within the object detection zones 48, 50 and 52. For example, the object detection zones 48, 50 and 52 may comprise or otherwise be formed by capacitive or resistive touch pads 48, 50 and 52 that form the bounds of the object detection zones. Capacitive touch pads are sensors that rely on conductivity for detection and can measure, among other things, proximity, pressure, position, displacement and force. Resistive touch pads are sensors that rely on electrical resistance changes caused by the application of force and can measure, among other things, pressure, position, displacement and force. The touch pads may comprise multiple stacked substrates whose dimensions define the object detection zones 48, 50, 52. Any suitable sensors may be used other than resistive or capacitive sensors, such as a strain gage that can be used to measure force/load.

Figure 2:
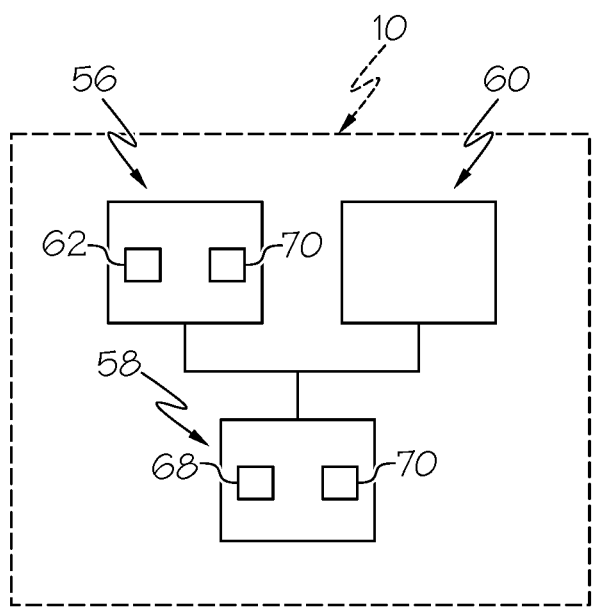
FIG. 2 schematically depicts interaction between the object detection system, occupant classification system and airbag control system of the vehicle of FIG. 1, according to one or more embodiments shown and described herein.

Referring to FIG. 2, the vehicle 10 may include an Occupant Classification System (OCS) 56, an airbag control system 58 and an object detection system 60. The OCS 56 may include one or more sensors 62 that is located in the vehicle 10 that provides a signal that is indicative of a characteristic of an object/person that is located in a vehicle seat. For example, the sensor 62 may be a load or pressure sensor that provides a signal indicative of weight of the person located in the vehicle seat. The OCS 56 may include a controller 70, such as an electronic control unit (ECU), that receives the signal and, based on the signal, can determine whether or not a person is in the vehicle seat and, in some embodiments, whether the person is a child or an adult. Other sensors 62 may include seatbelt tension sensors, cameras, etc.

The OCS 56 and the object detection system 60 can provide information or control signals to the airbag control system 58. For example, the airbag control system 58 may include a controller 70 (e.g., an ECU) that controls deployment of airbag 68. The airbag control system 58 may or may not deploy the airbag 68, which the deployment can be based on the information provided by the OCS 56 and the object detection system 60. It should be noted that while the OCS 56, object detection system 66 and airbag control system 58 are shown as separate, connected systems, they may be integrated or partially integrated into a same or overlapping system.

Figure 3:
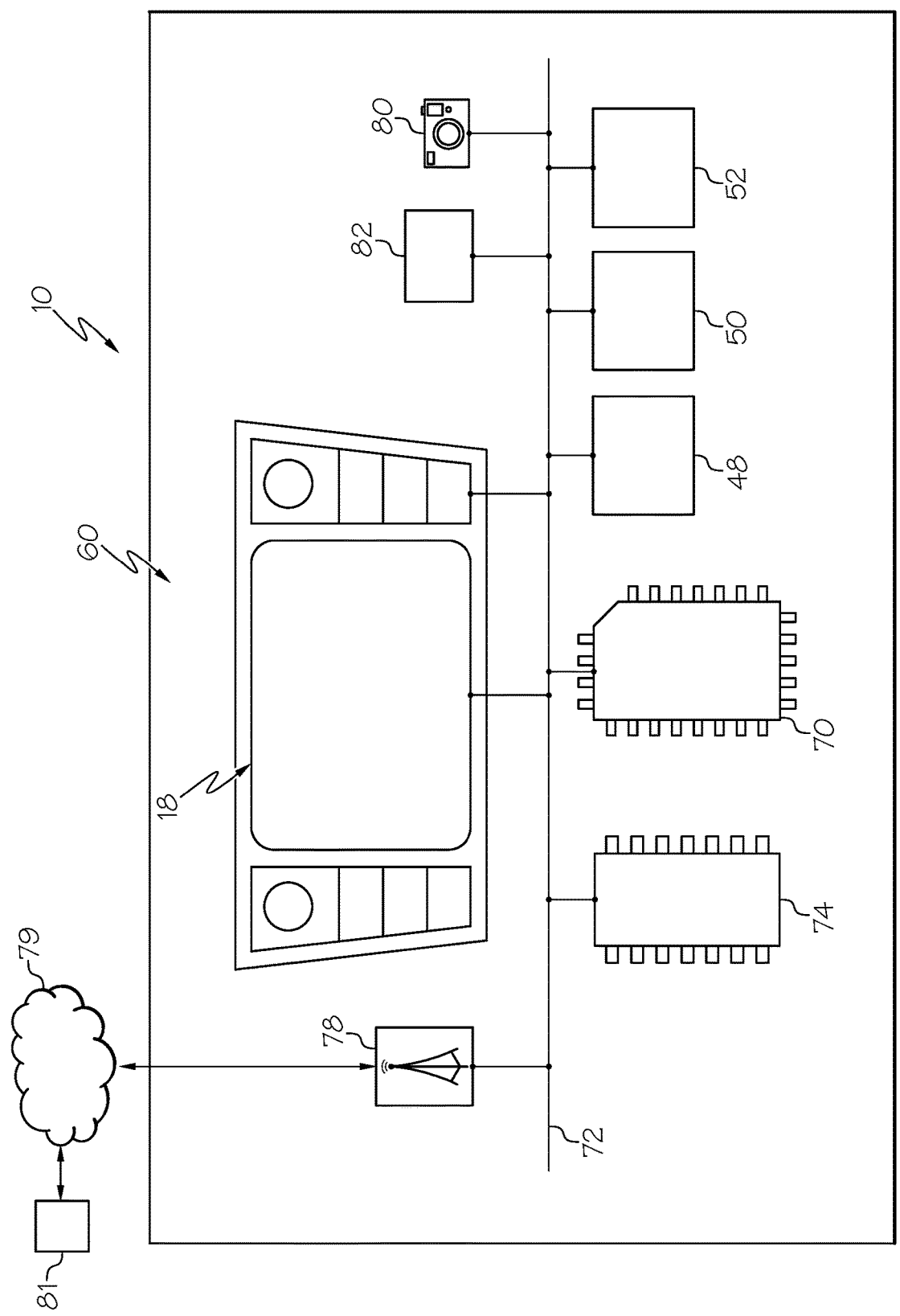
FIG. 3 schematically depicts the object detection system for the vehicle of FIG. 2, according to one or more embodiments shown and described herein.

Referring to FIG. 3, the vehicle 10 includes the object detection system 60 that utilizes the sensors/touch pads 48, 50, 52 to obtain information as to whether an object is located in one or more of the object detection zones 48, 50 and 52. The object detection system 60 includes one or more processors 70. Each one or more processor 70 may be any device capable of executing machine readable instructions. Accordingly, each one or more processor 70 may be a controller, an integrated circuit, a microchip, a computer, or any other computing device which may be collectively referred to as a controller. The one or more processors 70 are coupled to a communication path 72 that provides signal interconnectivity between various modules. Accordingly, the communication path 72 may communicatively couple any number of processors 70 with one another, and allow the modules coupled to the communication path 72 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 72 may be formed from any medium that is capable of transmitting a signal such as, for example, conductive wires, conductive traces, optical waveguides, or the like. In some embodiments, the communication path 72 may facilitate the transmission of wireless signals, such as WiFi, Bluetooth, and the like. Moreover, the communication path 72 may be formed from a combination of mediums capable of transmitting signals. In one embodiment, the communication path 72 comprises a combination of conductive traces, conductive wires, connectors, and buses that cooperate to permit the transmission of electrical data signals to components such as processors, memories, sensors, input devices, output devices, and communication devices. Accordingly, the communication path 72 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle 10 further includes one or more memory modules 74 coupled to the communication path 72. The one or more memory modules 74 may comprise RAM, ROM, flash memories, hard drives, or any device capable of storing machine readable instructions such that the machine readable instructions can be accessed by the one or more processors 70. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 74. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any suitable computer programming language, as pre-programmed hardware elements, or as a combination of hardware and software components.

The vehicle 10 comprises the display 18 for providing visual output such as, for example, maps, navigation, entertainment, information, or a combination thereof. The display 18 is coupled to the communication path 72. Accordingly, the communication path 72 communicatively couples the display 18 to other modules of the vehicle 10. The display 18 may include any medium capable of transmitting an optical output such as, for example, a cathode ray tube, light emitting diodes, a liquid crystal display, a plasma display, or the like. Moreover, the display 18 may be a touch screen that, in addition to providing optical information, detects the presence and location of a tactile input upon a surface of or adjacent to the display 18. Accordingly, the display 18 may receive mechanical input directly upon the optical output provided by the display 18. Additionally, it is noted that the display 18 can include at least one of the one or more processors 70 and the one or memory modules 74.

In some embodiments, the vehicle 10 comprises network interface module 78 The network interface module 78 can be communicatively coupled to the communication path 72 and can be any device capable of transmitting and/or receiving data via a network 79. Accordingly, the network interface module 78 can include a communication transceiver for sending and/or receiving any wired or wireless communication. For example, the network interface module 78 may include an antenna, a modem, LAN port, Wi-Fi card, WiMax card, mobile communications hardware, near-field communication hardware, satellite communication hardware and/or any wired or wireless hardware for communicating with other networks and/or devices 81. In one embodiment, the network interface module 78 includes hardware configured to operate in accordance with the Bluetooth wireless communication protocol. In another embodiment, network interface module 78 may include a Bluetooth send/receive module for sending and receiving Bluetooth communications to/from a mobile device.

The object detection system 60 includes the sensors/touch pads 48, 50, 52, also representing the object detection zones. The sensors/touch pads 48, 50, 52 are coupled to the communication path 72 such that the communication path 72 communicatively couples the sensors/touch pads 48, 50, 52 to other modules of the vehicle 10. The sensors/touch pads 48, 50, 52 may be any device capable of outputting a signal indicative of presence of one or more objects within one or more of the object detection zones 48, 50 and 52.

The vehicle 10 may further include another sensor or sensors, such as a camera 80 and speed sensor 82. The sensors 80 and 82 are coupled to the communication path 72 such that the communication path 72 communicatively couples the sensors 80 and 82 to other modules of the vehicle 10. For example, the sensor 82 may be any device capable of outputting a signal indicative of speed of the vehicle 10. The measured speed may be used by the airbag control system 58 to determine whether or not to deploy the airbag 68. Furthermore, the one or more memory modules 74 may include an image recognition database or algorithm to allow the controller 70 to identify the object and verify that the object in in one or more of the object detection zones 48, 50, 52.

Figure 4:
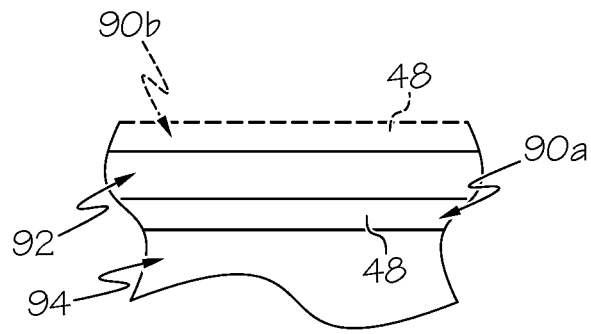
FIG. 4 depicts a method of controlling an airbag system using the object detection system of FIG. 3, according to one or more embodiments shown and described herein.

Referring to FIG. 4, the sensors/touch pads 48, 50, 52 may be part of a layer 90a and/or 90b that is located interior and/or exterior to an external skin layer 92 of the respective object detection zone. FIG. 4 illustrates a first embodiment with the layer 90a comprising a touch pad 48 that is located between the external skin layer 92 of the instrument panel 14 and the airbag deployment location 94. FIG. 4 also illustrates another embodiment with the layer 90b comprising the touch pad 48 that is located on the external skin layer 92 of the airbag deployment location 94. The size of the substrates making up the pads 48, 50, 52 can define the boundaries of the object detection zones 48, 50, 52 as the pads 48, 50, 52 may be configured to detect an object out to their perimeters.

Figure 5:
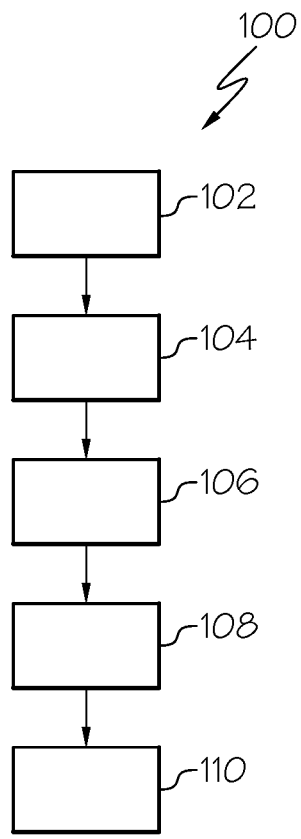
FIG. 5 illustrates an object detection pad on or under an external skin of a vehicle component, according to one or more embodiments shown and described herein.

Referring to FIG. 5, a process 100 for automatically controlling deployment of an airbag using an object detection system includes activating the object detection system 60 at step 102. The object detection system 60 may be activated upon activation of the vehicle 10 or upon activation be a user through a user input. At step 104, the controller 70 of the object detection system 60 looks for a signal from one or more of the sensors 48, 50 and 52. In some embodiments, the controller 70 of the object detection system 60 only looks for the signal if the OCS 56 determines there is a person in one or both of the passenger and/or driver seats. If no signal is provided from the one or more of the sensors 48, 50 and 52, the controller 70 of the object detection system 60 continues to look for the one or more signals from the sensors 48, 50 and 52. At step 106, a signal from the one or more of the sensors 48, 50 and 52 is received by the controller 70 of the object detection system 60. The signal from the one or more of the sensors 48, 50 and 52 may not only be indicative of presence of an object, such as a foot or other appendage, or product, such as headphones, containers, books, etc., placed on the respective object detection zone, but also of a size and/or weight of the object. At step 108, the controller 70 of the object detection system 60 may include logic that, based on the signal, instructs the display 18 to display an indication that an object is detected on one or more of the object detection zones. The controller 70 of the object detection system may also provide instructions to other devices using the network interface module 78, such as a personal computing device (e.g., smart phone). The controller 70 of the object detection system 60 may also include logic that is used to determine whether a characteristic of the object (e.g., weight, size, etc.) meets a predetermined threshold to instruct the controller 70 of the airbag control system 58 to disable deployment of the airbag 68, such as the passenger side airbag 68.

The above-described object detection systems allow a vehicle to detect when an object is located within an airbag deployment location (i.e., where an airbag may be deployed). If an object is detected within the airbag deployment location, a warning may be displayed and deployment of the airbag may be disabled by the airbag control system. These steps may be carried out only when the object detected meets certain predetermined criteria, such as size and/or weight thresholds.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    a vehicle structure comprising an airbag deployment location and an external skin layer that covers the airbag deployment location; and
    an object detection sensor located on or covered by the external skin layer of a vehicle component and located within an object detection zone;
    wherein the object detection sensor is configured to provide a signal to a controller upon detecting an object within the object detection zone, the object detection sensor comprising an object detection pad comprising a substrate whose dimensions define outermost boundaries of the object detection zone.

2. The vehicle of claim 1, wherein the object detection pad is located between the external skin layer and the airbag deployment location.

3. The vehicle of claim 1, wherein the object detection pad is located on an external surface of the external skin layer.

4. The vehicle of claim 1 further comprising an occupant classification system comprising another sensor that is used by the object detection system to determine whether an object is located in a seat of the vehicle.

5. The vehicle of claim 4, wherein the controller looks for the signal from the object detection sensor only if an object is detected in the seat by the occupant classification system.

6. The vehicle of claim 1, wherein the vehicle component is an instrument panel.

7. A method for automatically controlling deployment of an airbag using an object detection system, the method comprising:

activating the object detection system;

a controller of the object detection system looking for a signal from an object detection sensors located on or covered by an external skin layer of a vehicle component and located within an object detection zone, wherein the object detection sensor is configured to provide a signal to a controller upon detecting an object within the object detection zone, the object detection sensor comprising an object detection pad comprising a substrate whose dimensions define outermost boundaries of the object detection zone;

the controller of the object detection system receiving a signal from the object detection sensor; and the controller of the object detection system instructing an airbag control system to not deploy an airbag based on the signal.

8. The method of claim 7, wherein the step of the controller of the object detection system looking for the signal from the object detection system occurs only if an occupant classification system detects presence of an occupant in a seat of the vehicle.

9. The method of claim 8, wherein the seat is a passenger seat.

10. The method of claim 7 further comprising the controller of the object detection system providing instructions to a personal computing device upon receiving the signal from the object detection sensor.

11. The method of claim 7, wherein the object detection pad is located between the external skin layer and the airbag deployment location.

12. The method of claim 7, wherein the object detection pad is located on an external surface of the external skin layer.

* * * * *